July 14, 1964  G. G. KLIEWER  3,140,611
TEMPERATURE SIGNALING DEVICE
Filed July 24, 1961  2 Sheets-Sheet 1

GEORGE G. KLIEWER
INVENTOR
HUEBNER & WORREL
ATTORNEYS
BY
Richard M. Worrel

July 14, 1964  G. G. KLIEWER  3,140,611
TEMPERATURE SIGNALING DEVICE
Filed July 24, 1961  2 Sheets-Sheet 2
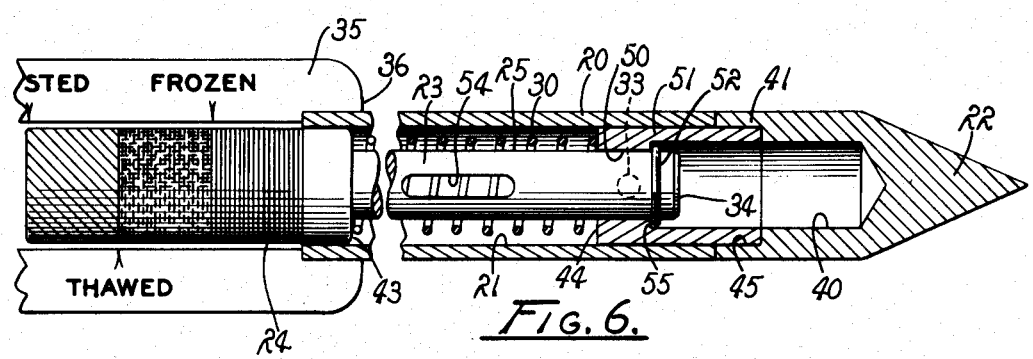
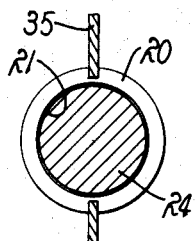 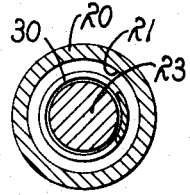 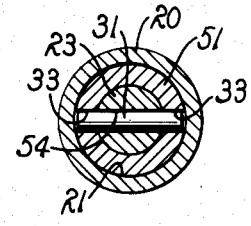 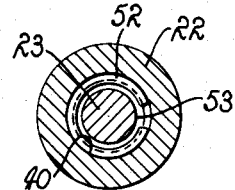
Fig. 7.  Fig. 8.  Fig. 9.  Fig. 10.
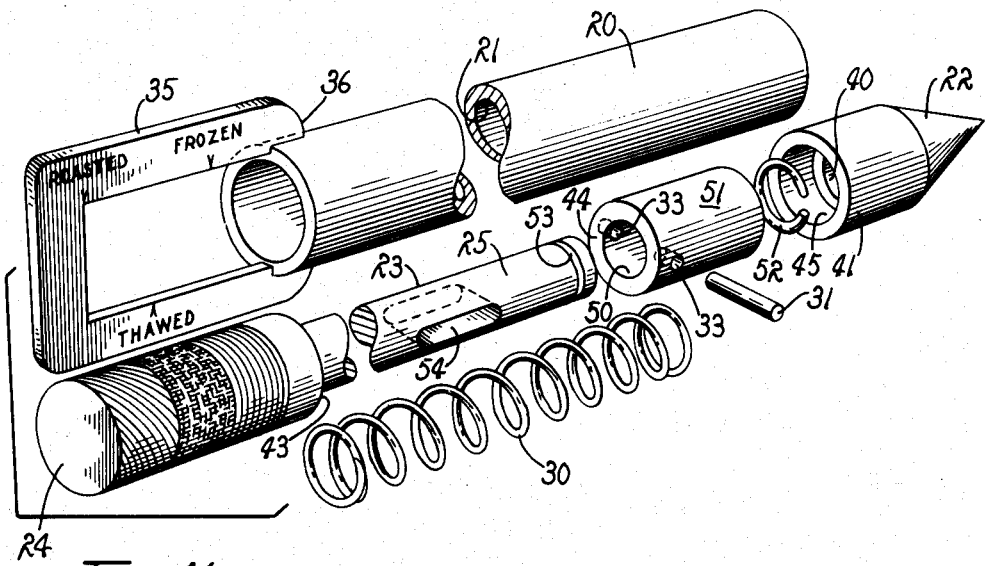
Fig. 11.
GEORGE G. KLIEWER
INVENTOR
HUEBNER & WORREL
ATTORNEYS
BY
Richard M. Worrel

United States Patent Office 3,140,611
Patented July 14, 1964

3,140,611
TEMPERATURE SIGNALING DEVICE
George G. Kliewer, Fresno, Calif., assignor to Commodity Marketers, Inc., a corporation of California
Filed July 24, 1961, Ser. No. 126,261
11 Claims. (Cl. 73—358)

This invention relates to a temperature signaling device for foods and the like which indicates the attainment of a predetermined temperature. The utility of the invention is conveniently illustrated in connection with the signaling of the attainment of a thawing temperature by frozen foods and the attainment of a cooking temperature by other foods but such illustrations are not to be construed as comprehensive of the entire useful application of the invention. Many other uses will occur to those skilled in the art.

In the preparation of certain items of foods, such as poultry, for distribution and marketing to the consumer, it is quite common to include the processing step of freezing each individual food items after packaging. Such a process is termed "Quick-freezing" and is well-known to those skilled in the art of processing perishable foods.

Once frozen, the food item must be stored in a refrigerated area so as to maintain a temperature below a thawing temperature. This thawing temperature varies somewhat for different foods. However, each frozen food must be maintained at a temperature below its respective thawing temperature to avoid deterioration. The degree of deterioration incident to temperature increase ranges from slight to such extent as to render the food unfit for human consumption.

The packers and ultimate vendors of frozen foods are vigilant to insure that the foods are properly frozen and maintained at a satisfactory temperature safely below the aforementioned maximum storage temperature. However, during the distribution of frozen foods, the possibility exists that the temperature thereof may exceed the optimum, even to the point of being thawed completely. Subsequent storage in a refrigerated area may re-freeze the food; however, its palatableness and/or fitness as food is then permanently affected. Accordingly, a need exists for a device which will readily indicate whether a safe storage temperature has been exceeded after the initial quick-freezing has been accomplished.

A problem has also existed in preparing a previously frozen food to convert it to an edible state. Prior to cooking a previously frozen, uncooked article of food, particularly poultry and other meats, the particular article should be completely thawed. This facilitates the maintenance of a proper rate of cooking or roasting. It also precludes the possibility of the outer portion being roasted, or "done," while the inner portion is still raw, or rare. In the case of frozen poultry, particularly turkeys, such an uncooked condition is most undesirable. If the roasting period is extended a sufficient period to compensate for the un-thawed inner portion, the usual result is a turkey which is unpalatable.

The problem of readily determining the temperatures attained during cooking is present with un-frozen foods, which may be either chilled or at ambient temperature. Examples are roasts, large vegetables, or tubers, such as potatoes, or fruits, such as squash. During the baking of such foods, the elapsed time is usually estimated according to the size of the food item. However, the most accurate method of properly baking such foods, is to measure precisely the internal temperature attained during the baking period. The device of the present invention permits the use of such an accurate method.

Accordingly, the principal object of the present invention is to provide a signaling device for indicating the attainment of a predetermined temperature by an item of food or other object.

Another object is to provide a recorder which will signify a pre-existing internal temperature of a substance.

Another object is to provide a readily discernible indicator of the edibility of previously frozen foods.

Another object is to incorporate into a thermally-responsive device a visual record of the internal temperature attained during a temperature increase of a food article or other object.

Another object is to provide a device for visually signaling the attainment of a predetermined internal cooking temperature of an article of food.

A further object is to provide a recorder which will indicate whether perishable foods have at a prior time reached an internal temperature to render them unpalatable and/or unfit for human consumption.

These, together with other objects, will become more fully apparent upon reference to the following description and accompanying drawings.

In the drawings:

FIG. 6 is similar to FIG. 4 and shows the device in a position to indicate a third condition of the food.

FIG. 7 is a transverse section taken on line 7—7 of FIG. 4.

FIG. 8 is a transverse section taken on line 8—8 of FIG. 4.

FIG. 9 is a transverse section taken on line 9—9 of FIG. 4.

FIG. 10 is a transverse section taken on line 10—10 of FIG. 4.

FIG. 11 is an isometric, exploded view of the device of FIG. 4, portions being shown fragmentarily for illustrative convenience.

Figure 1:
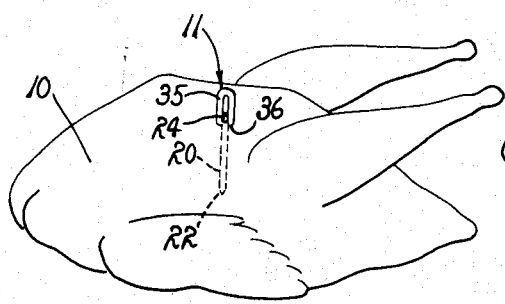
FIG. 1 is a perspective view of a dressed fowl which has been prepared for roasting and has a signaling device embodying the present invention inserted into the breast area thereof.

As illustrated in FIG. 1, the signaling device of the present invention is designed visually to indicate the attainment of a predetermined temperature of an article of food, such as a turkey 10, or other object. The signaling device, generally indicated at 11 is inserted into that portion of the fowl having the greatest mass and which requires the longest roasting time. In the case of most fowls, this portion is usually the breast area. Subsequent roasting of the fowl raises the internal temperature thereof, and upon reaching a predetermined temperature corresponding to the ideal roasted temperature of the particular fowl, the device signals the desired roasted condition in a manner described below.

Figure 2:
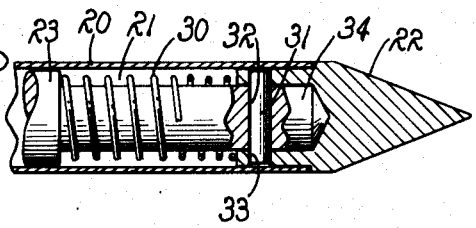
FIG. 2 is a fragmentary longitudinal section of the tip of the device of FIG. 1, showing one form of release mechanism.

The signaling device 11 embodying the present invention is shown in FIG. 2 comprising an outer housing 20 formed with a chamber 21 extending axially therethrough. The cross-sectional form of the outer housing may be circular, in the form of a flattened ellipse to facilitate insertion into the fowl 10, or other shape suited to economical production and convenience of use. The housing is preferably made from a substance having relatively low thermal conductivity, such as the polyethylene or styrene plastics. A portion of the outer housing adjacent to the inner end thereof is preferably of a material of relatively high thermal conductivity to transmit readily the internal temperature of the fowl to the temperature sensing means of the device which is subsequently described. A pointed tip 22 closes the inner end of the housing to form a fluid-tight capsule open at the opposite end. The entire tip member may be made of a material of high thermal conductivity so as to transmit the internal temperature as described below. The terms high and low thermal conductivity are in relation to the food being cooked, rather than absolute characteristics.

The chamber 21 is adapted to receive an indicator rod 23 which is arranged for longitudinal movement relative to the capsule formed by the housing 20 and the tip 22. The outer end 24 is marked with suitable indicia corresponding to the conditions of the fowl 10 to be represented thereby. The indicia may be either a printed legend such as "Not ready" to indicate an uncooked condition; phrases such as "Roasted" or "Well-done" could indicate a satisfactorily roasted condition. Portions of the rod could also be colored, such as yellow and green, to indicate unroasted and roasted conditions, respectively. The rod is adapted to be restrained in a retracted position so that the uncooked indicium used to correspond to an uncooked condition is viewable on the outer portion of the rod. The indicium corresponding to a roasted condition is exposed to view upon outward movement of the rod.

A spring 30 is interposed the rod 23 and the tip portion 22 of the housing 20 to bias the indicator rod outwardly. Movement of the rod toward the tip compresses the spring 30. The spring is maintained in a normally compressed condition by means of a fusible pin 31 received in suitable transverse latching bores 32 and 33 provided in the rod and tip member respectively. The pin comprises a thermoplastic substance having a predetermined fusing temperature which corresponds to the desired minimum cooking temperature of the food item with which the signaling device will be used. In the case of a device suitable to indicate the properly cooked condition of a turkey, the pin may be made from a metal or like substance having a fusing temperature of approximately eighty-four degrees centigrade. An example of a metal alloy which will fuse at this desired temperature, is formulated as follows: twelve parts of an alloy consisting of bismuth—52%, lead—40%, cadmium—8%, to which is added two parts of Wood's alloy.

With other food items, the fusing temperature of the pin may be selected to correspond to the ideal minimum cooking temperature of the particular food. The thermally-responsive pin may be formed from a thermoplastic material such as wax or any commercially available plastic provided that it has the proper fusing characteristics. The pin is located within the housing, preferably in the tip portion, so as to be in a thermally conductive relationship with the internal portion of the fowl 10.

The inner end 34 of the rod contacts the tip member to limit the inner movement of the rod at a position to effect registry of bores 32 and 33. After insertion of pin 31, the assembled rod and tip member is positioned within the housing, as shown, with the tip closing the housing in a fluid-tight relationship. An outer stop 35 in the form of an elongated bail limits the outward movement of the indicator rod 23. A projecting shoulder 36 of the bail limits the penetration of the signaling device 11 as it is inserted into the turkey 10. The radial projection 36 could be any suitable form apparent to those skilled in the art, so long as it functions to limit the depth of penetration of the housing 20.

Operation of the First Form

Assuming the device of FIG. 2 is to be used to signal visually the roasted condition of a fowl 10, the device 11 is inserted into the meatiest portion prior to placing the fowl in an oven or other enclosure in which the cooking is to be performed. As the temperature of the fowl is raised during the roasting operation, the thermally conductive tip portion 22 of the housing 20 transmits the attained temperature of the fowl to the fusible pin 31. Since the pin is selected to melt at a predetermined temperature, as soon as that temperature is reached, the pin melts and is sheared. Consequently, the biasing spring 30 is released from its normally restrained position. The energy stored in the spring thereby moves the indicator rod 23 outwardly, as illustrated by dotted lines, to a second position to indicate that the fowl has now attained a satisfactory temperature to render it completely roasted. The device may then be removed readily prior to serving the fowl.

Second Form

Figure 3:
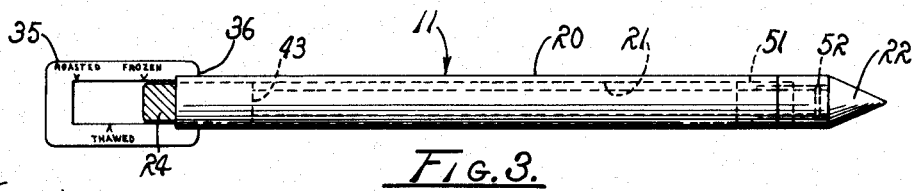
FIG. 3 is a side elevation, somewhat enlarged, of the device of FIG. 1, with an inner member shown in dashed lines.

A modified form of the signaling device shown in FIG. 3 is illustrated in FIGS. 4 to 11. The basic device is modified to incorporate a plurality of thermally-responsive latches to indicate successively temperatures of predetermined levels previously attained by an article to which the device has been inserted.

The outer housing 20 is closed at its inner end by a penetrating tip 22 formed of a material of relatively high thermal conductivity. The tip has an open ended chamber 40 extending longitudinally and coaxially with the outer housing. Received within chamber 40 is the inner end 34 of indicator rod 23 which is so proportioned with respect to chamber 40 to provide an annular space 42 about said inner end.

The biasing spring 30 encircles the indicator rod 23 which is biased outwardly by the spring engaging a shoulder 43 on the rod and a spring seat 44 in the housing 20.

Selected indicia corresponding to conditions of the fowl 10 are marked on the outer end 24 of the indicator rod 23 by suitable colors, such as green, yellow, and red to indicate the corresponding frozen, thawed and roasted conditions of the fowl. Supplementary verbal indicia may also be marked on the outer bail 35 secured to the housing 20.

By referring to FIG. 11, the component parts of the signaling device 11 may be seen in an unassembled condition. The biasing spring 30 is adapted to encircle reduced portion 25 of indicator rod 23. The spring is compressed axially by movement of the rod inwardly as the inner end 34 is inserted through the bore 50 of a sleeve member 51 adapted to be received within the housing 20 to form a portion thereof. A snap ring 52 maintains the sleeve in an assembled condition on the rod by cooperating with an annular groove 53 in the end of the rod which receives the snap ring. The rod 23 is moved inwardly in relation to the sleeve 51 so as to register an elongated axially extending slot 54 with latching bores 33 provided in the sleeve. A fusible latch pin 31 is inserted through latching bores 33 and slot 54 to provide a lost-motion connection between the sleeve portion of the housing and the indicator rod. This lost-motion connection permits a limited range of movement of the rod between the axial limits of the slot 54. The tip 22 includes inner chamber 40 proportioned to receive the end of rod 23 and a fluid adapted to solidify at a predetermined temperature. A counterbore 45 is adapted

Operation of the Second Form

The operation of the second form of the subject invention is believed to be readily apparent and is briefly summarized at this point. The operation of the second form is quite similar to the device shown in FIG. 2 with the additional provision of a second thermally-responsive release mechanism in conjunction with a lost-motion connection which adapts the device to indicate three separate and successive conditions of the fowl.

Figure 4:
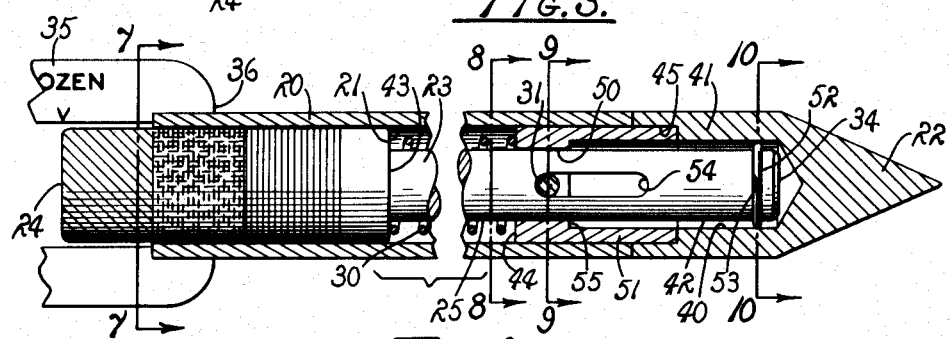
FIG. 4 is a foreshortened vertical, longitudinal section, further enlarged, of the device of FIG. 1 modified with supplementary indicating mechanism shown in greater detail and in a position to indicate a frozen condition of a food into which the device has been inserted.
Figure 5:
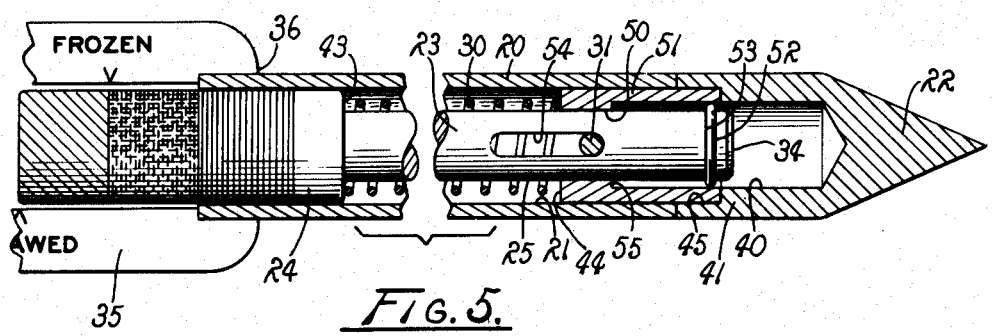
FIG. 5 is similar to FIG. 4 with the device shown in a position to indicate a second condition of the food upon being subjected to a given temperature.

Referring to FIG. 4, the annular space 42 is first filled with a sodium chloride brine or other suitable substance which will solidify at a predetermined temperature substantially coincident with the maximum safe storage temperature of the fowl. The signaling device 11 is then inserted into the fowl 10 prior to freezing. The indicator rod 23 is moved to its extreme inward position, and may be held in such position by a temporary block placed between the outer end 24 of the rod and the bail 35. Upon subsequent quick-freezing of the fowl and consequent solidification of the brine in annular chamber 42, the block may be removed. The rod will then be restrained in its innermost position by the interaction of snap ring 52 and the inwardly disposed flange 55 on sleeve 51 which are separated by the solidified brine.

Upon subsequent warming of the fowl 10 above a maximum safe storage level which is coincident with the melting point of the solidified brine, the biasing spring 30 is free to move the indicator rod 23 outwardly a distance corresponding to the axial length of slot 54. The position of the indicator rod in such a condition is shown in FIG. 4 with the inner end of slot 54 in contact with pin 31 to limit its outward movement. The yellow portion of the indicator rod as an indicium of an unsafe condition is then exposed as a visible signal to the vendor or a customer purchasing the fowl. A printed legend may also be used in conjunction with the bail 35 and an index reference mark on the rod to indicate verbally the condition of the fowl.

When the fowl 10 has attained an internal temperature sufficient to thaw so as to release the rod 23 to indicate a thawed condition, the fowl is then ready for roasting. Subsequent roasting brings the fowl to a temperature corresponding to that predetermined best for the type of fowl or other article involved. In the case of a turkey, the recommended attained internal temperature for a properly roasted condition is approximately 84° C. Accordingly, pin 31 should be formed of a substance which will fuse at the desired maximum internal temperature for the fowl or other food being cooked.

A metal alloy which is adapted for use in roasting turkeys and will fuse at 84° C. is formulated as indicated above. With other food items, the fusing temperature of the pin 31 may be selected to correspond to the ideal minimum cooking temperature of the particular food. The latching pin may be formed from a thermoplastic material such as a wax or any commercially available plastic substance provided that it has the proper thermoplastic characteristics.

When a sufficiently high internal temperature of the fowl 10 has been attained and transmitted to the pin 31 by means of the thermally conductive portion of the housing, the pin melts at that attained temperature to release the indicator rod 23. The biasing spring 30 then moves the rod outwardly to the maximum limit of travel determined by the outer bail 35. The snap ring 52 could also be utilized for this purpose. When the indicator rod has been moved to its maximum outward position, the colored indicium representing a roasted condition is then exposed beyond the outer limits of the housing. As in the case of a verbal indication of the frozen and thawed conditions, a legend "roasted" could also be provided on the outer bail.

Although the invention has been herein shown and described in what is conceived to be the most practical and preferred embodiments, it is recognized that departures may be mdae therefrom within the scope of the invention, which is not to be limited to the details disclosed herein but is to be accorded the full scope of the claims so as to embrace any and all equivalent devices and apparatus.

Having described my invention, what I claim as new and desire to secure by Letters Patent is:

1. A signaling device for insertion into an article of food to indicate successive conditions of the food corresponding to previously attained internal temperatures of predetermined intensity comprising an outer housing of low thermal conductivity; a penetrating tip of high thermal conductivity closing the inner end of the housing; a signal rod carried within the housing for movement relative thereto; indicia on the rod corresponding to conditions of the food existing when said predetermined temperature levels are reached; normally restrained biasing means within the housing to urge said rod in an outward direction; a first fusible latch between the housing and the rod in thermally conductive relationship with the tip to maintain said rod in a first condition-indicating position when the internal temperature is below a first predetermined level and to release said propelling means when a first predetermined level is attained by the food; a second fusible latch between the housing and the rod to limit the range of movement of said indicator rod to a second condition-indicating position upon the release of said first means and in thermally conductive relationship with the tip to release said biasing means to move the rod to a third condition-indicating position when a second level of predetermined internal temperature is attained; and a lost-motion connection between the rod and said second latch to permit movement of the rod from said first position to said second position.

2. An indicator device to signal visually successive frozen, thawed, and roasted conditions of a fowl or the like when predetermined internal temperatures corresponding to those conditions have been previously attained by the fowl comprising a tubular member of relatively low thermal conductivity; a penetrating tip of high thermal conductivity closing one end thereof; an indicator rod carried within the tubular member for motion relative thereto; inner and outer stop means carried on the tubular member and operably associated with the rod to limit the range of movement of the rod; biasing means interposed the rod and the closed end of the tubular member to urge the rod outwardly; a first thermally-responsive release means within the tubular member for restraining said indicator rod from outward motion and maintaining the rod in a first condition-indicating position when the fowl is in a frozen condition and adapted to free said rod when the fowl is above a first predetermined temperature and in a thawed condition; a second thermally-responsive release means within the housing to limit outward movement of the rod to a second condition-indicating position when the fowl is in a thawed condition; and a lost-motion connection between the rod and said second release means to permit a predetermined range of movement of the rod from said first position to said second position; said second release means being fusible at a predetermined temperature corresponding to the internal temperature attained by the fowl as it reaches a roasted condition to free said rod for further outward movement to a third condition-indicating position determined by said outer stop means; both said first and second release means being disposed thermally in series with said tip.

3. The indicator device of claim 2 wherein said first thermally-responsive release means comprises a chamber in said tip, the inner end of said rod being positioned within said chamber and relatively proportioned to define an annular space therebetween, and a sodium chloride brine filling said space and adapted to solidify below said first predetermined temperature and to liquify at said temperature.

4. The indicator device of claim 2 wherein said second thermally-responsive release means is a metal alloy characterized by having a melting point of approximately eighty-four degrees centigrade.

5. The indicator of claim 4 wherein said alloy consists of two parts of Wood's alloy and twelve parts of an alloy of bismuth fifty-two percent, lead forty percent, and cadmium eight percent.

6. A signaling device to be inserted into an article to indicate attainment of a predetermined internal temperature comprising an elongated housing having a penetrating tip at once end and an opening at the opposite end, the housing being fluid-tight except for said opening, formed of a thermally conductive imperforate material, and provided with an axial cavity therein leading to the open end; an axially extended indicator rod received in said cavity and adapted for axial slidable movement relative to the housing to and from retracted and extended positions, the rod having a transverse bore therethrough, said cavity having therein latching means; resilient biasing means interposed the rod and the housing and adapted to urge the rod toward its extended position; means affording a lateral projection carried by the housing to limit penetration thereof into an article; and a fusible latch pin disposed through said transverse rod bore and retained against said latching means normally to restrain the biasing means and to maintain the rod in its retracted position, the pin being in thermally conductive relationship to the housing and adapted to release the rod upon attainment of said predetermined temperature.

7. A signaling device to be inserted into an article to indicate attainment of a predetermined internal temperature comprising an elongated housing having a penetrating tip at one end and an opening at the opposite end, the housing being fluid-tight except for said opening, formed of a thermally conductive imperforate material, and provided with an axial cavity therein leading to the open end; an axially extended indicator rod mounted in said cavity and adapted for axial slidable movement relative to the housing to and from retracted and extended positions, the rod having a transverse bore therethrough, said housing having a wall portion provided with a pair of opposed latching bores therein; resilient biasing means interposed the rod and the housing and adapted to urge the rod toward its extended position; means carried by the housing to limit penetration thereof into an article; means carried by the housing to facilitate manual removal of the device from an article; and a fusible latch pin disposed through said transverse rod bore and retained in said latch bores normally to restrain the biasing means and to maintain the rod in its retracted position, the pin being in thermally conductive relationship to the housing and adapted to release the rod upon attainment of said predetermined temperature.

8. A signaling device to be inserted into an article to indicate attainment of a predetermined internal temperature comprising an elongated housing having a penetrating tip at one end and an opening at the opposite end, the housing being fluid-tight except for the opening, formed of a thermally conductive imperforate material, and provided with an axial cavity therein leading to the open end; an axially extended indicator rod substantially received in said cavity and adapted for axial slidable movement relative to the housing to and from retracted and extended positions, the rod having a transverse bore therethrough, said housing having a wall portion provided with a pair of opposed latching bores therein; resilient biasing means interposed the rod and the housing and adapted to urge the rod toward its extended position; a bail secured to the housing adjacent the open end thereof, the bail affording a projecting shoulder to limit penetrating of the housing into an article and providing a portion remote from said shoulder and spaced axially from the open end to facilitate manual removal of the device from an article; indicia carried by the bail and corresponding to attainment of said predetermined temperature; and a fusible latch pin disposed through said transverse rod bore and retained in said latch bores normally to restrain the biasing means and to maintain the rod in its retracted position, the pin being in thermally conductive relationship to the housing and adapted to release the rod upon attainment of said predetermined temperature.

9. A thermally responsive signaling device for insertion into an article to indicate successive conditions of the article corresponding to previously attained internal temperatures of the article, comprising an outer housing having a thermally conductive penetrating tip closing one end of the housing to fluid penetration, the housing having an open end opposite from the tip and provided with an axial cavity leading to the open end; a signal rod disposed within the cavity and adapted for axial slidable movement relative to the housing; indicia provided on one end of the rod and corresponding to conditions of the article existing when said predetermined temperatures are attained; a tubular sleeve loosely received on the inner end of the rod opposite from said indicia; peripheral, frictionally engageable restraining means carried on said inner end of the rod inwardly from said sleeve, the sleeve being rigidly secured to the housing; a compression spring encircling the intermediate portion of said rod and bearing against the sleeve to urge the rod outwardly from the cavity; a first thermally responsive latch means frictionally engaging the sleeve and said restraining means carried on the inner end of the rod to maintain said rod in a first condition-indicating position when said internal temperature is below a first predetermined level and adapted to release said rod when said internal temperature reaches said first level; a second fusible latch means between the housing and the rod to limit the range of outward movement thereof to a second condition-indicating position upon the release of said first latch means and in thermally conductive relationship with the tip to release said rod and permit said spring to move the rod outwardly to a third condition-indicating position when a second predetermined temperature is attained; and a lost motion connection between the rod and said second latch to permit movement of the rod from said first position to said second position.

10. The device of claim 9 wherein said second latch means comprises a fusible pin transversely received in opposed bores provided in the sleeve and extended through a longitudinally extended transverse slot provided in the indicator rod, the longitudinal extent of said slot being coextensive with the spacing of said indicia on the rod corresponding to conditions existing respectively above said first and second temperature levels.

11. A signaling device to be inserted into an article to indicate attainment of a predetermined internal temperature comprising: an elongated housing having a penetrating tip at one end and an opening at the opposite end, the housing being fluid tight except for said opening, formed of thermally conductive imperforate material, and provided with an axial cavity therein leading to the open end; an axially extended indicator rod loosely received in said cavity and for axial slidable movement relative to the housing to and from retracted and extended positions, said rod having an indicating portion at one end adapted to be extended from said housing and a transverse bore through the other end; a tubular sleeve loosely received on said other end of the rod, said sleeve being rigidly secured to the housing; a compression spring encircling the intermediate portion of said rod and bearing against said sleeve and rod to urge the rod outwardly from the cavity; and, a fusible latch pin extending through said transverse bore and into engagement with said sleeve to normally restrain said spring and to maintain the rod in its retracted position, the pin being in thermally conductive relationship to the housing and adapted to release the rod upon attainment of said predetermined temperature.

References Cited in the file of this patent

UNITED STATES PATENTS

| | | |
|---|---|---|
| 1,147,483 | Clark | July 20, 1915 |
| 1,441,307 | Swanberg | Jan. 9, 1923 |
| 2,472,266 | Ouellette | June 7, 1949 |
| 2,805,575 | Fredericks | Sept. 10, 1957 |

FOREIGN PATENTS

| | | |
|---|---|---|
| 282,424 | Great Britain | Mar. 14, 1929 |